United States Patent
Gundermann et al.

(10) Patent No.: US 7,172,057 B2
(45) Date of Patent: Feb. 6, 2007

(54) VIBRATION DAMPER WITH AMPLITUDE-DEPENDENT DAMPING FORCE

(75) Inventors: Frank Gundermann, Schonungen-Marktsteinach (DE); Joachim Kühnel, Dittelbrunn (DE); Christian Böhm, Rannungen (DE); Heinz-Joachim Gilsdorf, Donnersdorf (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/738,942

(22) Filed: Dec. 17, 2003

(65) Prior Publication Data

US 2004/0163906 A1    Aug. 26, 2004

(30) Foreign Application Priority Data

Dec. 17, 2002    (DE) ................. 102 58 815

(51) Int. Cl.
*F16F 9/50* (2006.01)
(52) U.S. Cl. ............... 188/282.6; 188/282.1; 188/313
(58) Field of Classification Search ........ 188/281, 188/282.1, 282.2, 282.4, 282.5, 282.6, 282.8, 188/313, 314, 316, 283, 317, 322.15
See application file for complete search history.

(56) References Cited

U.S. PATENT DOCUMENTS

| | | | | |
|---|---|---|---|---|
| 1,282,712 A | * | 10/1918 | Barrell | .............. 188/317 |
| 2,088,875 A | * | 8/1937 | Serste | .............. 188/281 |
| 2,713,401 A | * | 7/1955 | Serste et al. | .............. 188/288 |
| 5,190,126 A | * | 3/1993 | Curnutt | .............. 188/282.8 |
| 5,911,290 A | | 6/1999 | Steed | |
| 6,220,409 B1 | | 4/2001 | Deferme | |
| 6,672,435 B2 | * | 1/2004 | Lemieux | .............. 188/289 |

FOREIGN PATENT DOCUMENTS

| | | |
|---|---|---|
| DE | 1 264 165 | 3/1968 |
| DE | 40 02 882 C1 | 2/1991 |
| DE | 100 47 878 A1 | 11/2001 |

* cited by examiner

*Primary Examiner*—Thomas Williams
(74) *Attorney, Agent, or Firm*—Cohen Pontani Lieberman & Pavane LLP

(57) ABSTRACT

Vibration damper comprising a piston rod, which is guided with freedom of axial movement in a damping medium-filled cylinder and which carries a piston, which divides the cylinder into two working spaces. At least one of the two working spaces has a flow connection leading to a housing, in which a separating element separates at least one chamber from one of the two working spaces, where the volume of the minimum of one chamber in the housing has a size which is variable within defined limits. The separating element executes relative motion with respect to the housing, and is located in a permanent position with respect to the piston rod, whereas the housing is movable with respect to the piston rod.

19 Claims, 2 Drawing Sheets

VIBRATION DAMPER WITH AMPLITUDE-DEPENDENT DAMPING FORCE

BACKGROUND OF THE INVENTION

1. Field of the Invention

The invention relates to a vibration damper with amplitude-dependent damping force of the type having a piston rod axially movable in a cylinder and carrying a piston which divides the cylinder into two working spaces, a housing in which a separating element separates a variable volume chamber from one of the working spaces, and a flow connection which connects the chamber to the other of the working spaces.

2. Description of the Related Art

In the design of vibration dampers, there is always a compromise between a soft damping force characteristic, which emphasizes a comfortable ride, and a stiffer damping force characteristic, which emphasizes driving safety. Adjustable vibration dampers, whether switched or continuously variable, expand the possibilities, but they are much more expensive and are therefore reserved for vehicles of the luxury class.

In DE 40 02 882 C1, a hydraulic vibration damper is described, the piston rod of which is permanently connected to a housing. A membrane separates the housing into two chambers, each of which is connected to a working space of the cylinder. When the piston rod makes a short movement, the damping medium displaced from the compressed working space is pushed into the adjoining chamber of the housing, the membrane of which makes possible a slight increase in the size of the chamber. The enlargement of the chamber is a function of the amplitude of the movement of the piston rod. When the stroke of the piston rod exceeds a certain defined value, the damping medium must be displaced into the pressure-relieved working space of the cylinder through a valve connected in parallel to the chamber.

The use of the housing with the membrane makes it possible in particular to isolate effectively the high-frequency vibrations of small amplitude from the vehicle body and thus also to provide a comfortable ride even though the chassis is suspended more stiffly.

Reference can also be made to DE 100 47 878 A1, in which a rigid valve body instead of an elastically deformable membrane is used inside the housing.

From these two sources, the expert concludes that the housing, which is permanently screwed to the piston rod, is comparatively massive. In the variant according to FIG. 3 of DE 100 47 878 A1, it is also pointed out that the housing, together with the piston, can be connected by known fastening techniques to the piston rod, but in this case the housing has a load-bearing function and must be designed to have the necessary strength.

SUMMARY OF THE INVENTION

The task of the present invention is to advance the development of vibration dampers with an amplitude-dependent damping force characteristic in such a way that the housing which accepts a limited amount of damping medium is of simpler design.

This task is accomplished according to the invention by fixing the separating element with respect to the piston rod, whereas the housing is movable relative to the piston rod.

One of the essential advantages thus obtained is that the piston rod that is used can be nearly the same as a series rod. In addition, the separating element can be made as a solid component, which can thus be considered noncritical with respect to long-term strength.

The separating element is formed by a flange, which is attached to the piston rod. The term "attached" also includes the possibility that the flange is an integral part of the piston rod.

In a further elaboration of the invention, the housing is provided with at least one restoring spring element for each direction of movement of the piston rod to be equipped with the amplitude-dependent damping force adjustment function. A helical spring, a cup spring, or even an elastomeric body can be used as the restoring spring element. The selection of the type of spring will be determined on the basis of the amount of space available and on the desired spring characteristic.

According to one embodiment, the housing is in the form of a cup with a bottom and a sleeve part, where the bottom and the sleeve part work together with the separating element to form the chamber, the volume of which varies independently of the direction in which the piston rod moves. It is advantageous for the housing to be made of a piece of sheet metal.

Thus an edge of the sleeve part of the housing which projects beyond the separating element forms at least one axial support surface, which limits the travel of the housing. The support surface can be obtained by subjecting the edge to further shaping.

So that the amplitude-dependent damping force function will operate within narrow tolerances, a sealing ring for sealing off the chamber is provided between the separating element and the housing.

So that optimum use can be made of the available space and so that the number of parts required can be kept small, the separating element is formed by a threaded element, which holds a component of the piston mounted on the piston rod, this component being, for example, the piston body or the preload spring for a valve disk of the piston.

For this purpose, it is possible for the threaded element to have a graduated external contour, where a first shoulder performs the separating function within the housing, while the second shoulder has at least one key surface. This facilitates the mounting of the separating element together with the housing on the piston rod.

The flow connection leading from the working space to the chamber inside the housing should have a relatively large cross section, it's size being preferably independent of the effects of temperature. On the other hand, the cross section should not be too large, or otherwise the load-bearing capacity of the piston rod would be reduced too much. To obtain an effectively throttled flow, a baffle is provided inside the flow connection leading to the chamber of the housing, the open cross section of which baffle is smaller than the cross section of the flow connection.

It is advantageous for the baffle to be formed by the separating element.

So that the throttling effect within the flow connection can be adjusted more effectively, the baffle can be designed inside a disk, which is itself held by the separating element. The disk can be modified as needed.

With respect to the load exerted by the pressure inside the chamber, the flange is a component of a sleeve carrier. A relatively long distance is thus available, if needed, for the threaded connection between the flange and the piston rod.

To avoid leaks, which would in turn negatively affect the damping force characteristic of the vibration damper, the housing is sealed off with respect to the piston rod assembly.

It is also possible for the sleeve carrier, relative to the piston, to be located in the outward-travel direction of the piston rod. Even when the housing is designed in this way, a continuous piston rod is still present, which can be made as a single unit, if desired.

The sleeve carrier can have at least one flow link leading from the flow connection to the minimum of one chamber.

So that the sleeve carrier can be mounted with any desired circumferential orientation, a collecting groove is provided between a guide neck on the piston rod for the sleeve carrier and an inside wall of the sleeve carrier; this groove connects the flow connection to the flow link in the sleeve carrier.

The restoring spring element can be more easily adjusted to a desired damping force characteristic if the piston rod is provided with a stop surface for limiting the axial movement of the housing. In this case, the restoring spring element does not have to be compressed into a solid block to define the end position of the housing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
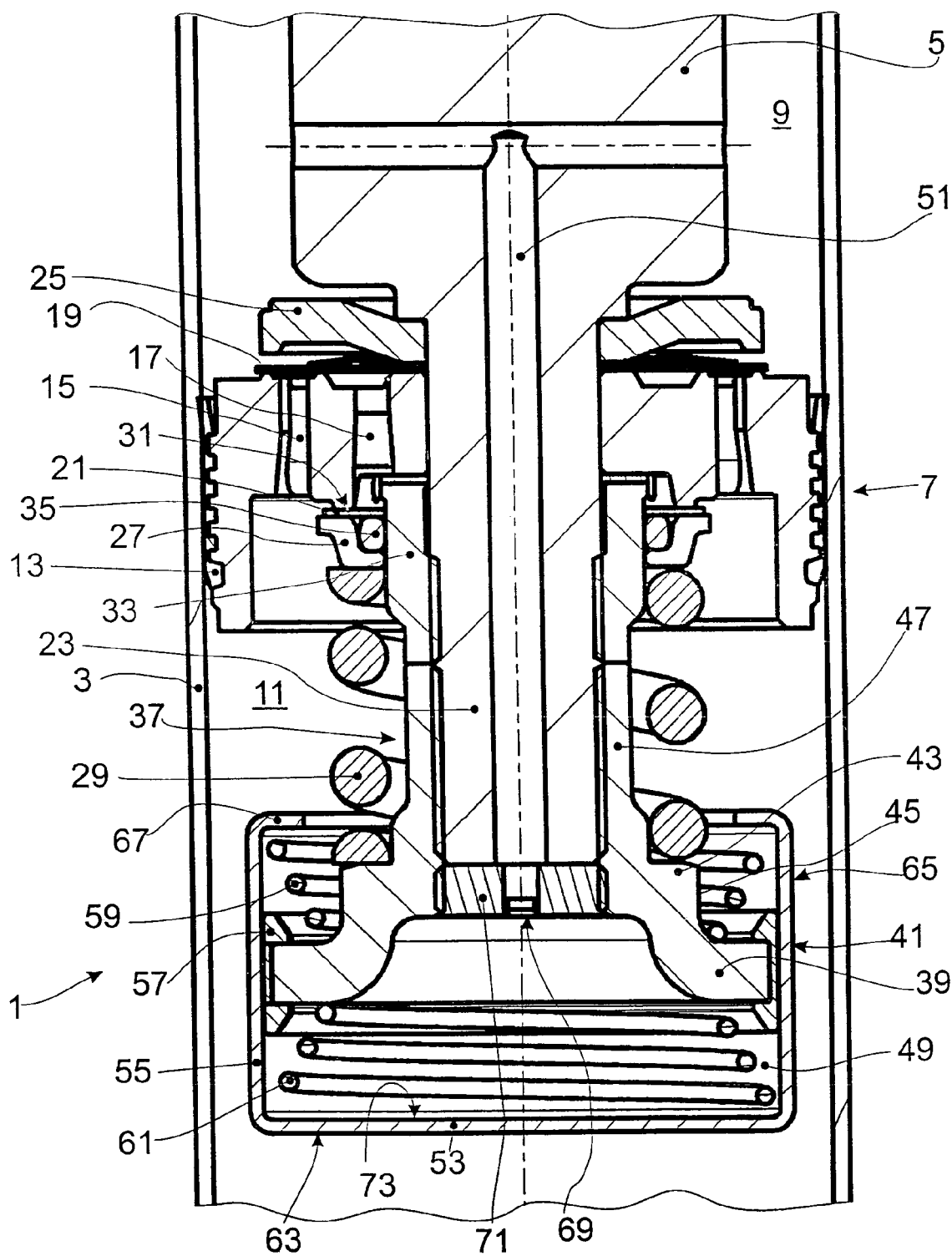
FIG. 1 shows a vibration damper with an axially movable housing underneath the piston.

FIG. 1 shows a part of a vibration damper 1 with a damping medium-filled cylinder 3, in which a piston rod 5, together with a piston 7, is installed with freedom of axial movement. The piston separates the cylinder into a first, upper working space 9 and a second, lower, working space 11, relative to the piston, where the piston carries a piston ring 13. Inside the piston are flow-through channels 15; 17, which are covered at their ends by at least one valve disk 19; 21, so that the flow can pass through the channel or group of such channels in only one direction. The piston 7 is mounted permanently on a piston rod neck 23. An elastic valve disk 19, extending around the inside diameter, is clamped to the top surface of the piston; the maximum lift of the disk is limited by a support disk 25. On an inner reference circle, at least one pass-through channel 17 allows passage of damping medium when the piston rod moves in the direction of the upper working space, where the thin valve disk 21 together with a massive valve ring 27 can rise from the surface 31 of a valve seat against the force of a helical compression spring 29. The valve ring 27 is centered in the piston by a mounting nut 33, and a sealing ring 35, which is installed between the valve disk and the valve ring, prevents leakage toward the mounting nut.

The helical spring 29 is held on a threaded element 37, which has a graduated external contour. The first shoulder of a flange-shaped formation acts as a separating element 39 inside a housing 41, which is supported with freedom of axial movement with respect to the piston rod 5. The second shoulder of the flange 43 has at least one key surface 45, so that the preload of the helical spring can be adjusted. The flange-like separating element has a sleeve carrier 47, which is designed with an internal thread and which can thus be screwed permanently onto the external thread of the piston rod. The housing 41 cooperates with the separating element 39 to form a chamber 49, which is connected by a flow connection 51, which in the present case is inside the piston rod, to the upper working space 9. As a result, the chamber 49 is also permanently filled with damping medium.

The housing 41 is shaped like a cup with a bottom 53 and a sleeve part 55. The chamber of the housing mentioned above is formed by the bottom, the sleeve part, and the separating element, where the volume of the chamber changes independently of the direction in which the piston rod moves. A sealing ring 57 is provided between the separating element and the housing to seal off the chamber. For each direction of movement of the piston rod to be equipped with the amplitude-dependent damping force adjustment function, a restoring spring element 59; 61 is provided. In this case, a first restoring spring element 61 is clamped between the bottom 53 of the housing 41 and the separating element 39. Thus a restoring movement is achieved when pressure is exerted on the outer bottom surface 63 of the housing 41.

The edge 65 of the sleeve part of the housing extending beyond the separating element 39 is designed with at least one axial support surface 67 for limiting the travel of the housing when the piston rod moves and the housing moves away from the piston. The second restoring spring element 59 is clamped between the minimum of one axial support surface and the top of the separating element.

When the piston rod moves toward the upper working space 9, the damping medium passes through an opening (not shown) in the upper valve disk 19 into the minimum of one inner through-channel 17 and strikes the thin valve disk 21, in which, if desired, a very small, permanently open cross section can be provided. This permanently open cross section can be formed either by a notch in the piston body or by an opening in the valve disk. The flow connection 51, which is connected hydraulically in parallel, also accepts displaced damping medium and conducts it away toward the chamber 49 inside the housing 41. A baffle 69 can be used inside the flow connection, the open cross section of this baffle being smaller than the open cross section of the flow connection, so that a throttling effect is produced by the baffle. In this embodiment, the baffle is formed not by the separating element itself by rather by a disk 71, which is itself held by the separating element.

The damping medium displaced into the chamber 49 exerts a compressive force on an inner bottom surface 73 of the housing, this force being directed against the force of the second restoring spring element 59 located above the separating element 39. After the housing 41 has been displaced to the maximum extent relative to the separating element 39 and the piston rod 5 continues to move in the same direction, the pressure on the thin valve disk 21 and on the valve ring 27 will increase. As soon as the pressure has increased sufficiently, it will push the disk 21 and the ring 27 away from the valve seat 31. Because of the hydraulically parallel connection of the minimum of one pass-through channel 17 and the flow connection 51 leading to the chamber 49, short movements of the piston rod are thus filtered out by the axial movements of the housing, and when a certain damping force is reached inside the baffle 69 or in the previously mentioned inlet cross section, the valve ring 27 will open with a soft response.

Upon the conclusion of the movement of the piston rod at the moment in question, the upper restoring spring element 59, which is under greater preload than the lower restoring spring element 61, will move the housing 41 back into the normal position relative to the separating element, the normal position being determined by the elastic forces of the two oppositely acting restoring spring elements 59; 61.

When the piston rod moves from the rest position toward the lower working space 11, damping medium will flow into the minimum of one outer through-channel 15 and strike the upper valve disk 19; an inlet cross section can also be provided here between the upper valve disk and the piston. Simultaneously, a compressive force acts on the outer bottom surface 63 of the housing 41 against the force of the lower restoring spring element 61. The maximum pressure surface of the bottom is determined by the inside diameter of the chamber 49. When the compressive force shifts the housing relative to the separating element 39, the volume of the chamber 49 is also decreased, and damping medium is thus displaced through the baffle 69 and onward through the flow connection 51 into the upper working space 9. Although only one chamber 49 is present, the amplitude-dependent damping force operates in both directions of piston rod movement.

Figure 2:
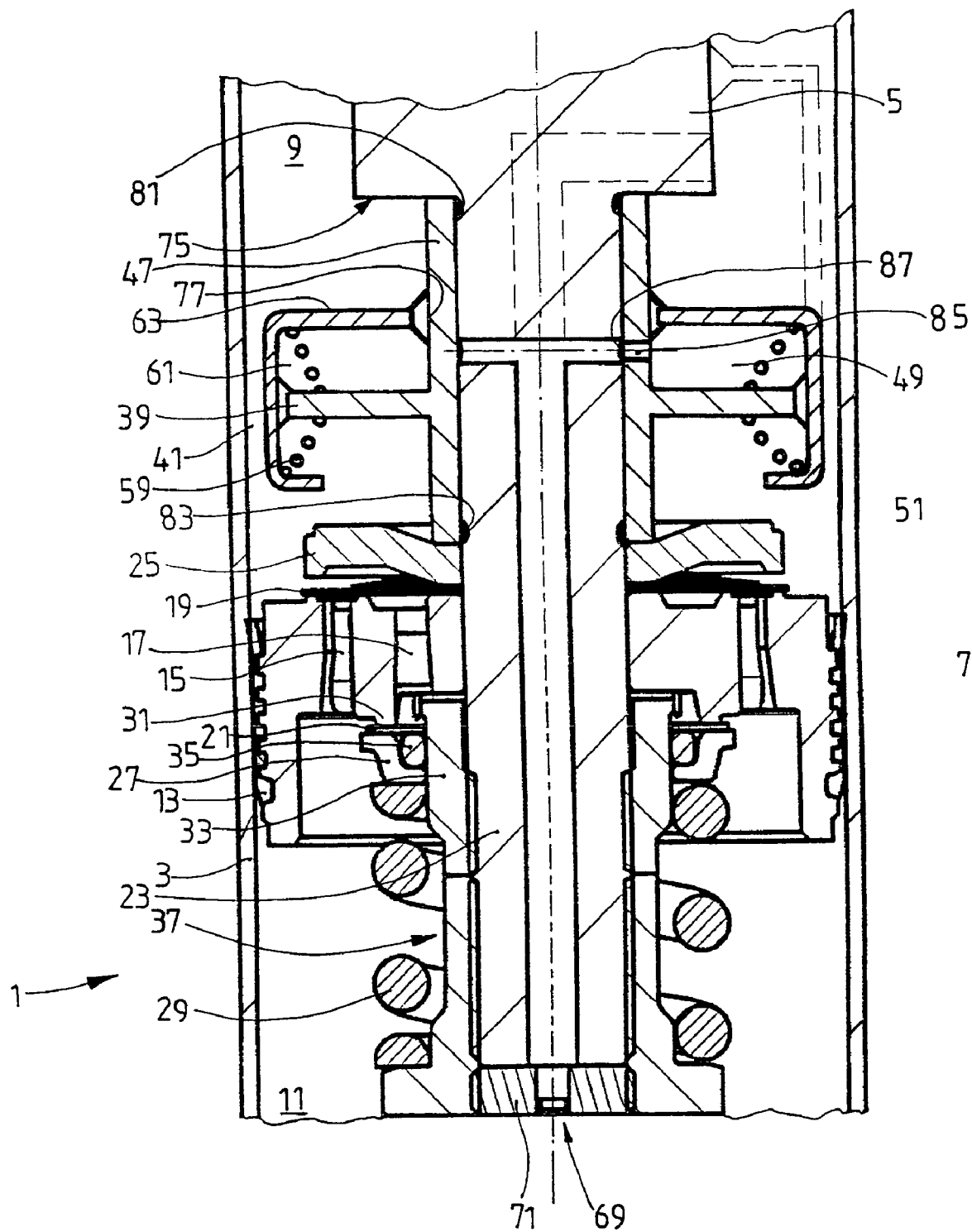
FIG. 2 shows an axially movable housing above the piston.

FIG. 2 is intended to show that the axially movable housing 41 can also be located above the piston 7. The design of the piston is completely identical to the variant shown in FIG. 1. As can be derived from FIG. 2, the sleeve carrier 47 of the separating element 39 is clamped between an offset 75 of the piston rod and the piston, i.e., in this case the upper support disk 25 on the piston. In general, two variants are conceivable with respect to how the bottom 53 of the housing 41, which has a pass-through opening 77, can be designed. A first design is shown in solid line, according to which the bottom 53 extends radially from the piston rod neck 23. The variant shown in broken line is intended to show that the piston rod can also be used to guide the housing 41. In each case, the pass-through opening 77 in the bottom of the housing is sealed off from the piston rod or the sleeve carrier 47, that is, from the piston rod assembly. In addition, the sleeve carrier 47 can be sealed off by seals 81, 83 from the piston rod neck.

So that the damping medium can be displaced between the chamber 49 and the lower working space 11 via the flow connection 51, the sleeve carrier 47 has at least one flow link 85. A collecting groove 87 between the inside wall of the sleeve carrier and the piston rod neck 23 means that the minimum of one flow link 85 can be located at any point in the sleeve carrier relative to the flow connection 51 inside the piston rod 5.

The damper functions in exactly the same way as the embodiment described in conjunction with FIG. 1. When the piston rod moves toward the upper working space 9, a pressure builds up on the outer bottom surface 63 of the housing, and the damping medium is displaced between the bottom 53 and the separating element 39 via the flow connection 51 into the lower working space 11. When the piston rod moves toward the lower working space, the damping medium enters the flow connection 51 and arrives in the variably-sized chamber 49 in the housing 41.

In the case of the variant in which the housing 41 slides on the sleeve carrier 47, the offset 75 of the piston rod from the piston rod neck can form a stop surface to limit the axial movement of the housing. In comparison with the housing variant shown in broken line, this solution also offers a larger pressure surface for the damping medium and makes it possible for the displacement of a certain volume of damping medium to be compensated by a shorter axial displacement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper comprising:
   a cylinder filled with damping medium;
   a piston rod which is movable axially in said cylinder, said piston rod carrying a piston which divides said cylinder into two working spaces;
   a housing in one of said two working spaces, said housing having a chamber separated from said one of said working spaces by a separating element which is stationary with respect to said piston rod, said housing being movable with respect to said piston rod so that said chamber has a volume which is variable within defined limits, and wherein said housing comprises a bottom and a sleeve part forming a cup which cooperates with said separating element to form said chamber, the volume of said chamber varying independently of the direction of movement of the piston rod;
   a pair of restoring spring elements acting between said housing and said piston rod, each said restoring spring element corresponding to a respective direction of movement of said housing with respect to said piston rod; and
   a flow connection connecting the other one of said working spaces to said chamber.

2. A vibration damper as in claim 1 wherein said separating element is formed by a flange attached to the piston rod.

3. A vibration damper as in claim 2 further comprising a sleeve carrier attached to said rod, said flange being formed on said sleeve carrier.

4. A vibration damper as in claim 3 wherein said piston rod can move in an outward direction with respect to said cylinder, said sleeve carrier being located in the outward direction with respect to said piston.

5. A vibration damper as in claim 3 wherein said flow connection comprises a flow link through said sleeve carrier.

6. A vibration damper as in claim 1 further comprising a sealing ring mounted between said separating element and said housing.

7. A vibration damper as in claim 1 further comprising a threaded element which is threaded onto said piston rod against a component of said piston, said separating element being formed on said threaded element.

8. A vibration damper as in claim 7 wherein said threaded element has a graduated external contour comprising a first shoulder on said separating element and a second shoulder having a key surface.

9. A vibration damper as in claim 1 wherein said flow connection comprises a constriction which serves as a baffle.

10. A vibration damper as in claim 9 wherein said baffle is formed by said separating element.

11. A vibration damper as in claim 9 further comprising a disk held by said separating element, said baffle being formed in said disk.

12. A vibration damper as in claim 5 wherein said flow connection comprises a circumferential groove on said piston rod, said groove communicating with said flow link.

13. A vibration damper as in claim 1 wherein said piston rod comprises a stop surface which limits axial movement of said housing with respect to said piston rod.

14. A vibration damper as in claim 1 wherein said separating element is in said housing.

15. A vibration damper as in claim 1 further comprising a threaded element which is threaded onto said piston rod against a component of said piston, said separating element being formed on said threaded element.

16. A vibration damper comprising:
a cylinder filled with damping medium;
a piston rod which is movable axially in said cylinder, said piston rod carrying a piston which divides said cylinder into two working spaces;
a housing in one of said two working spaces, said housing having a chamber separated from said one of said working spaces by a separating element which is stationary with respect to said piston rod, said housing being movable with respect to said piston rod so that said chamber has a volume which is variable within defined limits, and wherein said housing comprises a bottom and a sleeve part forming a cup which cooperates with said separating element to form said chamber, wherein said sleeve part has a radially extending edge opposite from said bottom, said radially edge providing an axial support surface for limiting movement of the housing with respect to the piston rod, the volume of said chamber varying independently of the direction of movement of the piston rod;
at least one restoring spring element acting between said housing and said piston rod, each said restoring spring element corresponding to a respective direction of movement of said housing with respect to said piston rod; and
a flow connection connecting the other one of said working spaces to said chamber.

17. A vibration damper as in claim 16 comprising a pair of restoring spring elements acting between said housing and said piston rod, each said restoring spring element corresponding to a respective direction of movement of said housing with respect to said piston rod.

18. A vibration damper comprising:
a cylinder filled with damping medium;
a piston rod which is movable axially in said cylinder, said piston rod carrying a piston which divides said cylinder into two working spaces;
a housing in one of said two working spaces, said housing having a chamber separated from said one of said working spaces by a separating element in said housing which is stationary with respect to said piston rod, said housing being movable with respect to said piston rod so that said chamber has a volume which is variable within defined limits, and wherein said housing comprises a bottom and a sleeve part forming a cup which cooperates with said separating element to form said chamber, the volume of said chamber varying independently of the direction of movement of the piston rod;
at least one restoring spring element acting between said housing and said piston rod, each said restoring spring element corresponding to a respective direction of movement of said housing with respect to said piston rod, wherein each said restoring spring element is positioned between said separating element and said housing; and
a flow connection connecting the other one of said working spaces to said chamber.

19. A vibration damper comprising:
a cylinder filled with damping medium;
a piston rod which is movable axially in said cylinder, said piston rod carrying a piston which divides said cylinder into two working spaces;
a housing in one of said two working spaces, said housing having a chamber separated from said one of said working spaces by a separating element which is stationary with respect to said piston rod, said housing being movable with respect to said piston rod so that said chamber has a volume which is variable within defined limits, and wherein said housing comprises a bottom and a sleeve part forming a cup which cooperates with said separating element to form said chamber, the volume of said chamber varying independently of the direction of movement of the piston rod, wherein said chamber is sealed off from said one of said two working spaces by said separating element and said housing, thereby preventing flow of damping medium between said chamber to said one of said two working spaces during both compression and tension of said vibration damper;
at least one restoring spring element acting between said housing and said piston rod, each said restoring spring element corresponding to a respective direction of movement of said housing with respect to said piston rod; and
a flow connection connecting the other one of said working spaces to said chamber.

* * * * *